(12) United States Patent
Breuer et al.

(10) Patent No.: US 9,027,880 B2
(45) Date of Patent: May 12, 2015

(54) SCREEN FOR A PASSENGER CABIN

(75) Inventors: Matthias Breuer, Hamburg (DE); Michael Mosler, Plaisance du Touch (FR)

(73) Assignee: Airbus Operations GmbH (DE)

( * ) Notice: Subject to any disclaimer, the term of this patent is extended or adjusted under 35 U.S.C. 154(b) by 926 days.

(21) Appl. No.: 13/145,673

(22) PCT Filed: Jan. 12, 2010

(86) PCT No.: PCT/EP2010/050240
§ 371 (c)(1),
(2), (4) Date: Sep. 14, 2011

(87) PCT Pub. No.: WO2010/084048
PCT Pub. Date: Jul. 29, 2010

(65) Prior Publication Data
US 2012/0112505 A1    May 10, 2012

Related U.S. Application Data

(60) Provisional application No. 61/146,784, filed on Jan. 23, 2009.

(30) Foreign Application Priority Data

Jan. 23, 2009  (DE) .......................... 10 2009 005 905

(51) Int. Cl.
*B64D 11/00* (2006.01)
*B61D 49/00* (2006.01)
*B64D 11/06* (2006.01)

(52) U.S. Cl.
CPC ........ *B64D 11/0023* (2013.01); *B64D 11/0696* (2013.01); *B64D 11/0606* (2014.12)

(58) Field of Classification Search
CPC .................... B64D 11/0023; B64D 2011/0665
USPC ............ 244/118.5, 121; 52/29; 105/323, 324; 296/24.46, 83
See application file for complete search history.

(56) References Cited

U.S. PATENT DOCUMENTS

| | | | | |
|---|---|---|---|---|
| 3,423,121 | A * | 1/1969 | Lipkin | 296/24.4 |
| 3,563,594 | A * | 2/1971 | London | 293/128 |
| 4,899,962 | A | 2/1990 | Mueller | |
| 5,393,013 | A | 2/1995 | Schneider et al. | |
| 5,577,358 | A | 11/1996 | Franke | |
| 6,189,831 | B1 | 2/2001 | Asai et al. | |
| 6,286,579 | B1 * | 9/2001 | Gottschalk | 160/264 |
| 6,588,705 | B1 * | 7/2003 | Frank | 244/118.5 |
| 2008/0313964 | A1 | 12/2008 | Michel | |

FOREIGN PATENT DOCUMENTS

| | | |
|---|---|---|
| CA | 2614714 A1 | 1/2007 |
| CN | 101218149 A | 7/2008 |

(Continued)

*Primary Examiner* — Rob Swiatek
(74) *Attorney, Agent, or Firm* — Lerner, David, Littenberg, Krumholz & Mentlik, LLP

(57) ABSTRACT

A device for creating an individually delimited zone of a passenger cabin in a mode of transport for at least one passenger seat includes a modular cabin element that has been attached in a positionally variable manner to stationary guide rails of the passenger seat by way of quick-release fasteners. Associated with this cabin element is an extendable and affixable privacy screen roller blind that forms a flexible dividing element, which privacy screen roller blind extends from the underside of the hatrack or the PSU panel or the ceiling arrangement, and in the lateral region in addition the sidewall lining of the passenger cabin, to the modular cabin element, and by way of which privacy screen roller blind an individually delimited zone can be implemented.

13 Claims, 4 Drawing Sheets

(56) References Cited

FOREIGN PATENT DOCUMENTS

| CN | 101296843 A | 10/2008 |
|---|---|---|
| DE | 3802331 A1 | 9/1989 |
| DE | 4141606 A1 | 6/1993 |
| DE | 102005003154 A1 | 7/2006 |
| EP | 0708018 A1 | 4/1996 |
| EP | 0825060 A2 | 2/1998 |
| FR | 2893002 A1 | 5/2007 |
| WO | 93/01088 A1 | 1/1993 |

* cited by examiner

SCREEN FOR A PASSENGER CABIN

CROSS-REFERENCE TO RELATED APPLICATIONS

This application is a national phase entry under 35 U.S.C. §371 of International Application No. PCT/EP2010/050240, filed Jan. 12, 2010, published in German, which claims the benefit of the filing date of U.S. Provisional Patent Application No. 61/146,784 filed Jan. 23, 2009 and of German Patent Application No 10 2009 005 905.9 filed Jan. 23, 2009, the entire disclosures of which are hereby incorporated herein by reference.

TECHNICAL FIELD

The invention relates to a device for delimiting or separating a zone in a passenger cabin of a means of transport, to an aircraft, and to a method for installing and operating a device in a passenger cabin. In the present invention the term "compartment" refers to an essentially enclosed section or a delimited zone in a passenger cabin.

BACKGROUND TO THE INVENTION

To provide a delimited zone in passenger cabins, for example cabin crew rest-compartments or cabin crew rest-arrangements are known that comprise a curtain guided by a curtain rail or curtain panels. This measure, which can be solely installed at determined positions, is inflexible, requires considerable stowage space when not in use, and because of its partition components is associated with relatively heavy weight. Furthermore, it is known to arrange partitions in the center region and in the lateral region of passenger cabins so as to create different classes within the cabin. In this context a distinction is made between underbin partitions, which extend from the hatrack floor to the cabin floor, and full-height partitions, which extend between the cabin ceiling and the floor. Such partitions are preferably designed in a honeycomb design comprising prepreg; at the outside they comprise an aluminum edge protection profile. This design, which is relatively heavy, provides good rigidity, which is, however, not necessary for an element designed solely as a privacy screen or protective divider. Furthermore, these partitions can neither be flexibly installed in any desired positions in the passenger cabin, nor easily stowed away when folded. For delimiting a VIP region in a passenger cabin it is further known to cover an end region of the zone to be partitioned, in a manner similar to that of a crew rest compartment, by way of curtains guided in a curtain rail panel, in conjunction with a curtain rail that extends parallel to an aisle. This system, too, is inflexible as a result of the determined position, requires considerable stowage space when not in use, and is associated with considerable weight caused by the partition elements.

Such devices are used in order to carry out a division into different travel classes in the region of a passenger cabin. In order to ensure economically favorable utilization of the means of transport, adaptation of the respective travel class to the required seats is aimed for. From DE 38 02 331 A a device for partitioning an aircraft cabin is known which can be used in a positionally variable manner. This partitioning device, which is designed as a safety device, is in particular used to delimit a seat of fire in an aircraft cabin. Furthermore, from the state of the art, from DE 10 2005 003 154 A1, a space cell system is known which extends between a floor and a ceiling of the passenger cabin, and which is braced between the aforesaid. The size and weight of this space cell system provides an obstacle to fast installation.

SUMMARY OF THE INVENTION

It is an object of the invention, with a minimum of weight and required space, to economically provide flexible delimitation in a passenger cabin of a means of transport. According to claim 1, the above-mentioned object is met by a device which in order to create an individually delimited zone of the passenger cabin comprises a modular cabin element. The modular cabin element, which has been attached in a positionally variable manner to stationary guide rails of the passenger seat by way of quick-release fasteners, includes an adjustable privacy screen roller blind as a dividing wall. In order to implement an individually determined size of the delimited cabin region, the modular cabin element, and consequently the associated privacy screen blind, which forms a variable dividing-wall-replacing privacy screen, can be attached in a positionally variable manner as required, either straight or obliquely, to the guide rails. The concept according to the invention, which to the greatest possible extent corresponds to the function of a roller shutter, provides for the extendable privacy screen blind, which can also be referred to as a dividing element, to extend between the modular cabin element and a ceiling structure of the passenger cabin and in its functional position to be fixed in the region of the cabin ceiling. Underlining its flexibility, the privacy screen roller blind can also be locked in an infinitely variable manner at intermediate positions. Because of the modular cabin element variably attached to the guide rails of the passenger seats, and because of the adjustable privacy screen roller blind, the size of the screened-off region of the passenger cabin can advantageously be individually adjusted or determined.

The privacy screen roller blind can extend in a functional position between the modular cabin element and the underside of the hatrack, the passenger service unit (PSU) panel, the ceiling contour, and in the lateral region in addition in the sidewall lining.

In this manner, the invention expands the design options of arranging the passenger cabin, in particular for multiple use, thus providing a further component to represent a cabin-flex concept, wherein by way of a realizable expedient design and color scheme of the modular cabin element at the same time a positive visual effect can be achieved. Furthermore, the privacy screen roller blind according to the invention, which forms a dividing-wall replacing privacy screen, improves the comfort concept or safety concept and allows at short notice a separation into different cabin regions as required, for example in order to create a VIP region. Furthermore, by means of the invention, an emergency area can be created so that, in the case of an emergency, medical first aid can be administered in privacy, screened-off from passengers.

The privacy screen roller blind can be used for a delimited zone both in relation to an aisle-side straight course and in a lateral region. The compact design of the privacy screen concept according to the invention makes it possible with a minimum of weight and space requirement to implement an effective privacy screen that meets all the requirements of effective separation. Since, at those times when it is not in use, the privacy screen roller blind is accommodated in the modular cabin element, there is furthermore a stowage space advantage when compared to conventional systems. The concept according to the invention, which can be produced by means of an efficient production process, the simple installation and the option of adapting the passenger cabin to the respective user configuration at short notice, result overall in cost savings. Without negatively affecting the visual appearance of the passenger cabin, the invention makes it possible to provide a delimited zone or a compartment. There is an advantage in that the installation of the privacy screen blind according to the invention prevents the occurrence of any traces of gliding, scratching or lubricant on visible equipment components in the passenger cabin, and consequently the expenditure associated with cleaning and maintaining of the passenger cabin can be reduced. Furthermore, advantageously it is ensured that a passage cross section in the passenger cabin, in particular in the head region of the aisle, is not restricted as a result of the privacy screen concept according to the invention, and potential accident hazards to passengers are avoided.

Preferred advantageous improvements which serve the purpose of achieving maximum flexibility with the simplest possible design are provided in the dependent claims.

An important aspect of the invention consists of the device including several, or any desirable arrangement of, modular cabin elements with an integrated privacy screen blind to provide a partitioned-off cabin region that can be used as a compartment for passengers, a VIP region or as a cabin-crew rest compartment. In this manner at short notice individual partitioning of passenger seats, passenger seat groups or cabin regions can be achieved that match the then existing space requirements within the passenger cabins. Underlining the variability, the modular cabin elements can be arranged, as required, in a lateral manner, in a center-like manner and in lateral manner relative to a passenger seat or a passenger seat group. Improving the stability of the individual privacy screen roller blinds, it makes sense to connect or stabilize individual sections of privacy screen roller blinds by way of associated guide elements. Furthermore, the invention includes lateral attachment parts that can be attached by means of a front privacy screen roller blind, attached to the guide rail or seat rail of the passenger seat, for example by a flange connection, in order to implement a lateral privacy screen.

A further important aspect of the invention provides for the cabin to be divided into different passenger regions. By installing modular cabin elements, including associated privacy screen roller blinds in various zones of the passenger cabin, it is possible to implement travel classes for passengers, which travel classes are separated from each other.

The solution according to the invention provides another advantage in that activation or installation of the modular cabin element can to the greatest possible extent take place in a tool-free manner, manually, by the operating personnel. To this effect the privacy screen roller blind preferably includes a handle by way of which the privacy screen blind can be pulled into its functional position. As an alternative to this, it makes sense to provide automated servo-assisted operation in which, for example, with a push of a button, a servomotor integrated in the modular cabin element in conjunction with an actuator can be activated to adjust the privacy screen roller blind.

Irrespective of the type of operation, the privacy screen blind in its extended position, the functional position, can be affixed to a ceiling structure of the passenger cabin by at least one locking mechanism. To this effect, preferably retaining elements designed as attachment lugs are provided, which are, for example, arranged in spaces of the PSU panel or in the region of the hatracks.

A further important aspect of the invention furthermore takes into account privacy screen roller blinds of different designs. Preferably a privacy screen blind designed as a roller shutter is suitable, which in its non-functional position is accommodated in a space-saving manner in a receptacle of the modular cabin element. As an alternative to this, the privacy screen blind according to the invention can be designed as a venetian blind. The invention moreover includes further suitable foldable devices or devices that can be rolled up.

According to the invention, the privacy screen roller blind is preferably made from canvas, linen, a plastic foil, a rubber or some other suitable fatigue-resistant rollable material. In this arrangement the selection of material is limited to flame-retardant materials which, in particular, meet the criteria of fire class B1 (DIN 4102).

An important aspect of the invention relates to simple and quick assembly or installation of the modular cabin element. In order to meet this requirement, the cabin elements are locked to the guide rails of the passenger seats by way of quick-release fasteners. Furthermore, the modular cabin element is characterized by a compact installation-space-optimized design which, for example, preferably forms a closed hollow section profile, except for a passage for the privacy screen roller blind, in which cabin element the privacy screen blind in its non-functional position is rolled onto a cylinder or drum, in particular in the manner of a roller shutter. The hollow section profile can, furthermore, be used to receive an actuating device, for example a servomotor and an actuator, or can be used for accessories.

According to the invention, in the partitioned-off cabin region, as a safety device in at least one privacy screen blind an access is integrated. By way of this supplementary, door-like, opening in the case of an emergency it is possible for the passenger to leave the screened-off zone. For this purpose it is sensible to incorporate in the privacy screen blind a foldable element that can be swiveled on a vertical axis, wherein the opening that is normally covered comprises visual identification. As a further safety element, according to the invention the separated cabin region can include a display panel on the outside, by way of which display panel the extent of use or occupation is displayed to the crew.

An important aspect of the invention relates to the device according to the invention being able to be designed as a retrofit kit. Without adaptation work the modular cabin element can advantageously be integrated in an existing passenger cabin. Because of the attachment of the modular cabin element, by way of quick-release fasteners, to the guiderails of the passenger seats, this retrofit can take place quickly and at short notice.

According to the invention, the device can be used in an aircraft and other means of transport. In this arrangement the concept according to the invention inter alia makes it possible, in flight, if required, to create a partitioned-off space, a separate zone in the passenger cabin, for example so as to, in the case of an emergency, make it possible for a passenger to be treated in a zone delimited from the remaining passengers.

According to a further exemplary embodiment of the invention, a method for installing and operating a device for providing a delimited zone in a passenger cabin of a means of transport is provided. This device comprises at least one adjustable passenger seat, attached to stationary guide rails, as well as at least one modular cabin element, attached in a positionally variable manner to the guide rails, with an integrated privacy screen blind. The method comprises the following steps: to provide a divided passenger cabin, first the modular cabin element is installed in a positionally variable manner, by way of quick-release fasteners, to the guide rails of the passenger seat. Thereafter the extendable privacy screen roller blind, which is integrated in the modular cabin element, is adjusted, wherein said privacy screen in a functional position extends between the modular cabin element and a ceiling structure. As the last method-related step the privacy screen blind is affixed to a ceiling structure of the passenger cabin.

BRIEF DESCRIPTION OF THE DRAWINGS

Below, the invention is explained in more detail by means of exemplary embodiments with reference to nine drawings.

DETAILED DESCRIPTION OF EXEMPLARY EMBODIMENTS

Figure 1:
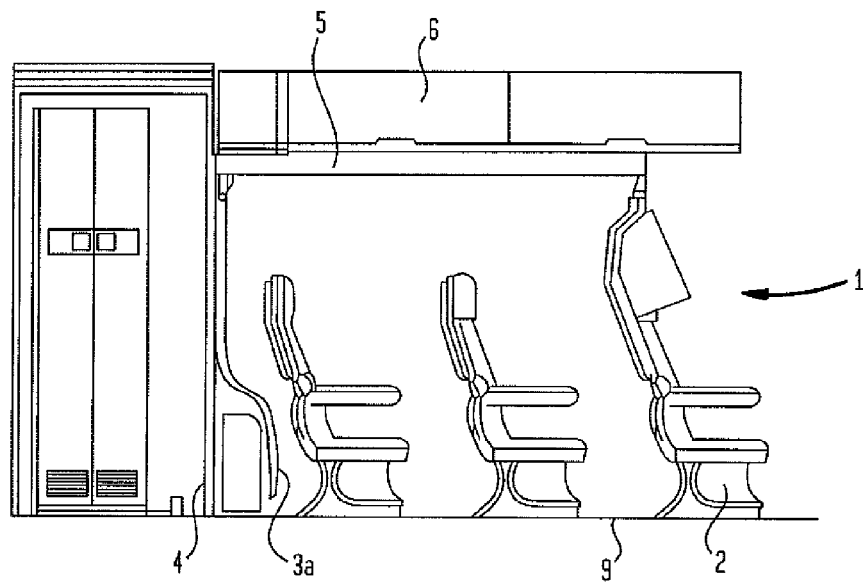
FIG. 1 shows a lateral view of a section of a known passenger seat arrangement of an aircraft with an integrated-curtain crew rest compartment.
Figure 2:
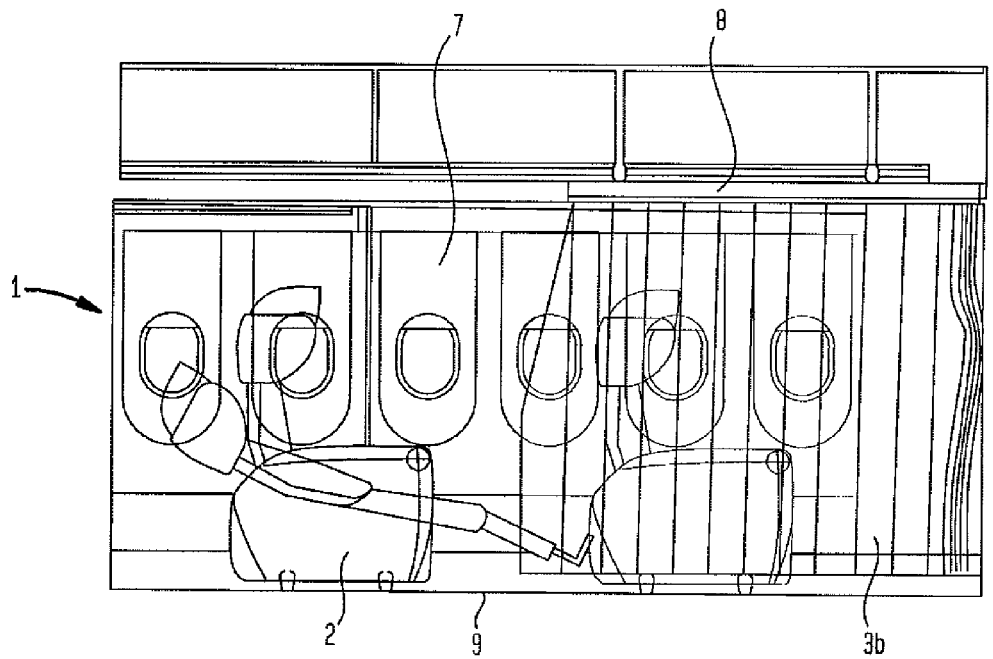
FIG. 2 shows a known region, delimited on the aisle side, in a passenger cabin of an aircraft.

FIGS. 1 and 2 show known solutions for separating a passenger seat group within a passenger cabin of an aircraft. The description of these figures is limited to explaining the measures by means of which a privacy screen or delimitation from the remaining cabin region is accomplished.

FIG. 1 shows a lateral view of a section of a passenger cabin 1 of an aircraft with several passenger seats 2, arranged one behind the other, which passenger seats 2 form a long-range curtain crew rest layout. In order to delimit or separate a cabin region, a curtain 3a is provided, which in FIG. 1 is held in an open position, tied together and held to a wall 4. The curtain 3a, which extends to a floor 9 of the passenger cabin 1, is guided in a rail that is integrated in the handrail 5, which rail extends above the passenger seats 2 in the region of a hatrack 6.

FIG. 2 shows a VIP region 7, partially screened-off by the curtain 3b, in the passenger cabin 1. The curtain 3b, which is guided in a separate curtain rail 8, also extends to the floor 9 of the passenger cabin 1 in order to ensure lateral partitioning-off from further cabin regions of the passenger seats 2.

Figure 3:
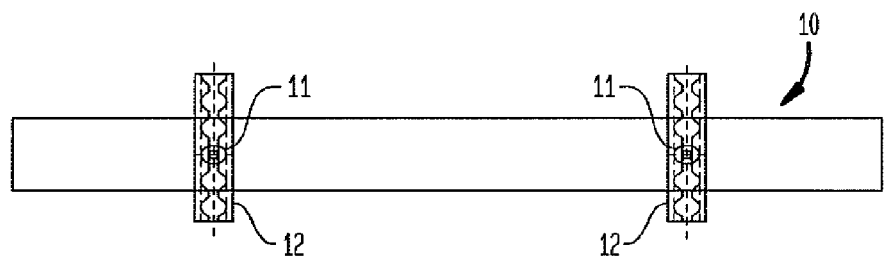
FIG. 3 shows a modular cabin element according to the invention, associated with the seat rails of the passenger seat.
Figure 4:
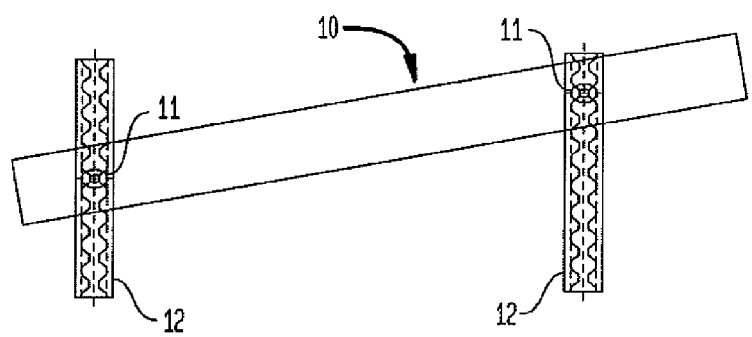
FIG. 4 shows the modular cabin element according to FIG. 3 in an oblique arrangement.

FIGS. 3 and 4 show the allocation of a modular cabin element 10 to guide rails 12. The modular cabin element 10, which comprises a rectangular box-like structure, is connected, in each case by way of a quick-release fastener 11, to parallel-extending guide rails 12 of the passenger seats 2. In FIG. 3 the modular cabin element 10 is arranged at a right angle to the guide rails 12, while in FIG. 4 it is arranged so as to extend obliquely relative to the guide rails 12. By way of the positionally variable attachment of the modular cabin element 10 in conjunction with an integrated privacy screen roller blind, variable regions in the passenger cabin 1 can be implemented that are partitioned off as required.

Figure 5:
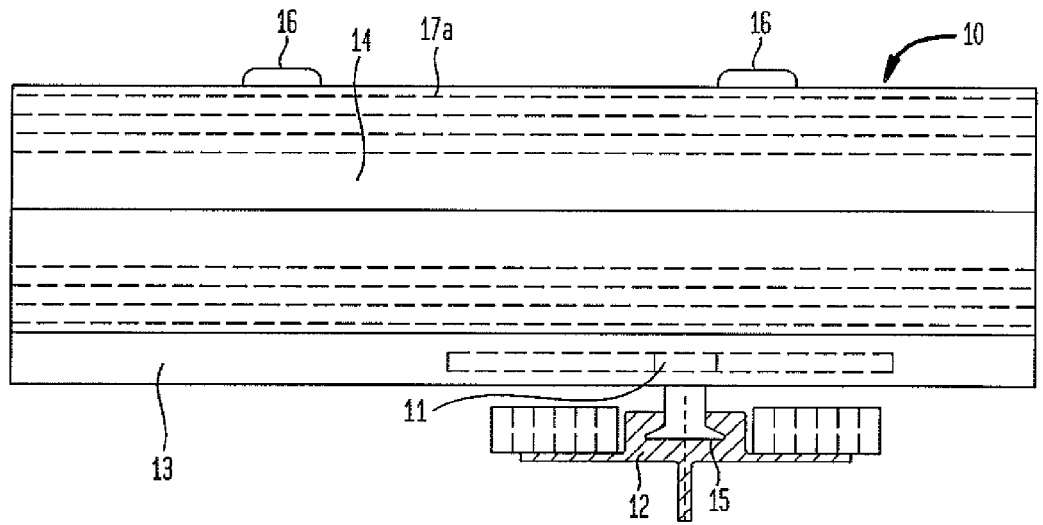
FIG. 5 shows an enlarged section of the modular cabin element including the device for attachment in the seat rail.

FIG. 5 in an enlarged section shows details of the modular cabin element 10 and its attachment in a positionally variable manner by way of the quick-release fastener 11, which in a certain range can additionally also be displaced in the Y-direction, and a guide 15 on the guide rail (seat rail) 12. The modular cabin element 10 comprises a box-like receptacle 13, which among other things is intended to accommodate a rotating drum 14, on which in a non-functional position a privacy screen in the form of a privacy screen roller blind 17a is rolled-up in a space-saving manner. Straps 16 are provided as a measure to manually pull the privacy screen roller blind 17a from the receptacle 13 and to move it into the functional position. Except for a longitudinal slit, which is intended for the purpose of feeding the privacy screen roller blind 17a through, the receptacle 13 forms to the greatest possible extent a hollow section profile, which in addition can receive an actuating device, for example a servomotor and associated actuators, as well as accessories. In order to achieve adequate tautening of the privacy roller screen 17a, the modular cabin element 10 includes a return spring which at the same time simplifies winding the privacy screen blind 17a onto the drum 14.

Figure 6:
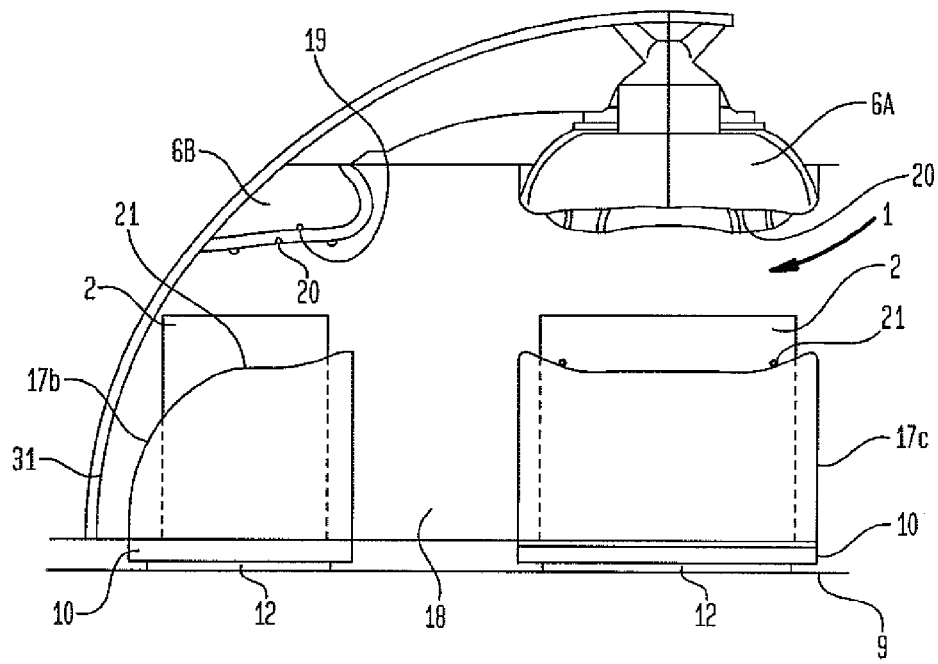
FIG. 6 shows partially extended privacy screen roller blinds, which provide a privacy screen, in the lateral region and in the center region.

FIG. 6 in each case shows a lateral privacy screen roller blind 17b, partly extended from modular cabin elements 10, as well as a center privacy screen roller blind 17c in the passenger cabin 1 of an aircraft, which, for example, together with further privacy screen roller blinds form screened-off zones within the passenger cabin 1. In this arrangement, the modular cabin elements 10 including the integrated privacy screen roller blinds 17b, 17c are positioned in such a manner that an aisle 18 arranged in between is not laterally restricted. The lateral privacy screen blind 17b, which is associated with the lateral passenger seats or other components/monuments 2, is geometrically designed in such a manner that in the extended position, the functional position, it conforms to the center hatrack 6A or to the contour of the lateral hatrack 6B or to the sidewall lining 31. The privacy screen roller blind 17c in the center region forms an end structure that to the greatest extent possible ensures a closed transition to a space of the PSU panel 20. Correspondingly, the privacy screen roller blinds 17b, 17c comprise attachment elements 21, which interact with corresponding receiving devices in the region of the underside of the lateral hatrack 19 or of the PSU panel 20, for affixing the privacy screen blinds 17b, 17c in the functional position.

Figure 7:
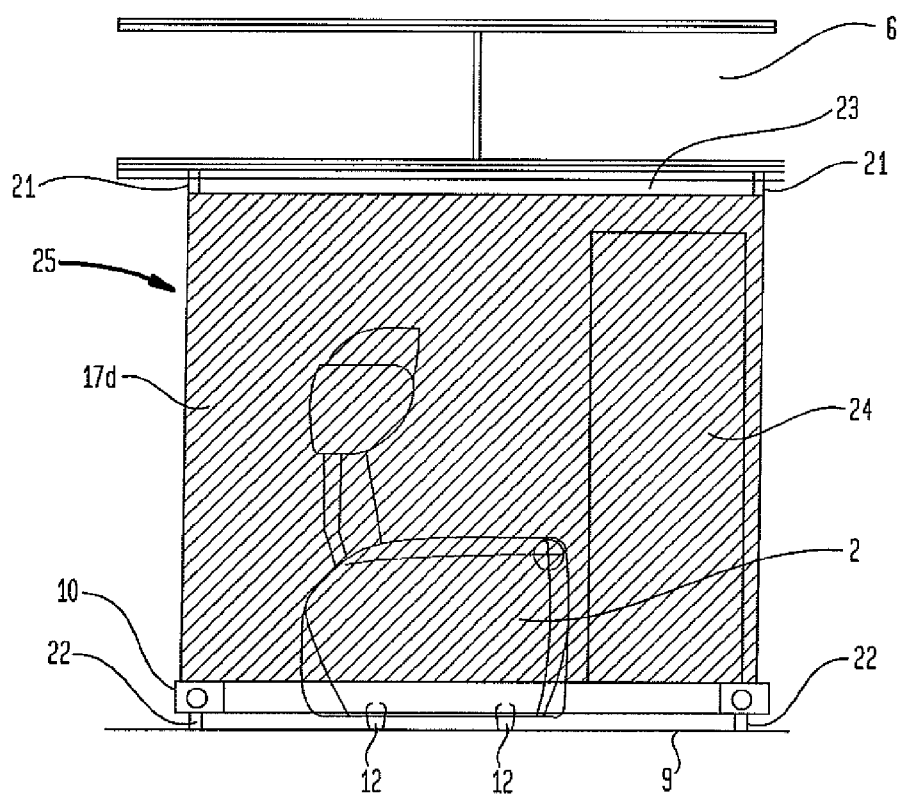
FIG. 7 shows a laterally extended privacy screen roller blind in its functional position (completely extended and hooked into the recessed grip or similar in the hatrack)

FIG. 7 shows a fully extended privacy screen roller blind 17d to form a screened-off zone 25, which privacy screen roller blind 17d is laterally associated with the passenger seat 2 and extends parallel to the aisle, wherein the modular cabin element 10 is supported or attached by the guide rails 12 as well as additionally at the sides being supported by the floor 9 by way of attachment points 22. The privacy screen roller blind 17d is detachably attached, by attachment elements 21, to a rail 23 that extends underneath the hatrack 6. The privacy screen blind 17d comprises a safety element in the form of an opening 24, which to the greatest possible extent is covered up, and which can, for example, be operated by a zip fastener, by way of which opening 24 passengers can leave the screened-off zone 25 in the case of an emergency.

Figure 8:
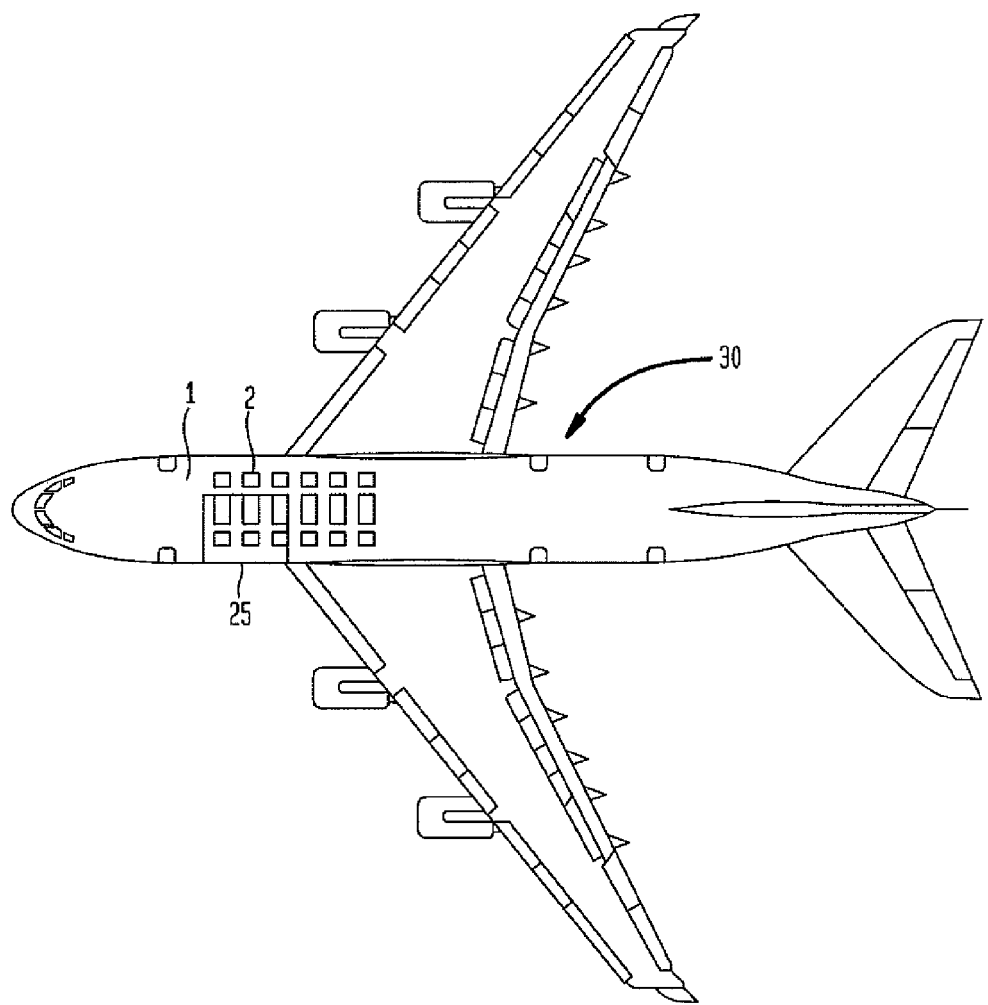
FIG. 8 shows an aircraft according to an exemplary embodiment of the invention.

FIG. 8 shows an aircraft 30 according to an exemplary embodiment of the invention, which comprises a passenger cabin 1 described above, in which at least one partitioned-off zone 25 is provided. FIG. 8 shows, for example, individual passenger seats 2 as well as a partitioned-off zone 25. As an alternative to this, the passenger cabin 1 can of course also comprise zones 25 that differ from the above, or it can comprise several partitioned-off zones 25.

Figure 9:
FIG. 9 shows a flow chart of a method according to an exemplary embodiment of the invention.

FIG. 9 shows a flow chart of a method according to an exemplary embodiment of the invention. In step 41, positionally variable installation of the modular cabin element on the guide rails of the passenger seat takes place. In step 42, adjustment of the privacy screen blind integrated in the modular cabin element takes place. In step 43, locking the privacy screen blind to a ceiling structure of the passenger cabin, hatrack bottom, PSU panel, grip rail of the hatrack, etc. takes place.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

LIST OF REFERENCE CHARACTERS

1 Passenger cabin
2 Passenger seat/monument etc.
3a Curtain
3b Curtain
4 Wall
5 Handrail
6A Center hatrack
6B Lateral hatrack
7 VIP region
8 Curtain rail
9 Floor
10 Cabin element (modular)
11 Quick-release fastener
12 Guide rail
13 Receptacle
14 Drum
15 Guideway
16 Strab
17a Privacy screen roller blind
17b Privacy screen roller blind
17c Privacy screen roller blind
17d Privacy screen roller blind
18 Aisle
19 Underside of the lateral hatrack
20 PSU panel
21 Attachment element
22 Attachment point
23 Rail
24 Opening
25 Zone
30 Aircraft
31 Sidewall lining

The invention claimed is:

1. A device for use in a passenger cabin of a means of transport, the device comprising:
at least one passenger seat;
guide rails, positioned so as to be stationary, intended for the at least one passenger seat;
a delimited zone for at least one passenger seat; and
at least one flexible privacy screen roller blind configured as a partition element to implement the delimited zone;
wherein the at least one privacy screen roller blind is associated with a modular cabin element attached in a positionally variable manner to the guide rails of the at least one passenger seat;
wherein the at least one privacy screen roller blind in a functional position extends between the modular cabin element and at least one element selected from the group consisting of:
an underside of a hatrack;
a passenger service unit (PSU) panel;
a ceiling structure; and
a sidewall lining.

2. The device for use in a passenger cabin of claim 1, wherein the passenger cabin comprises several delimited zones with which in each case at least one modular cabin element with an accompanying privacy screen roller blind is associated.

3. The device for use in a passenger cabin of claim 1, wherein the modular cabin element makes it possible to achieve any desired delimitation or division of the passenger cabin into different passenger regions, groups of seats for passengers, or travel classes.

4. The device for use in a passenger cabin of claim 1, further comprising:
manual or automated operation of the at least one privacy screen roller blind integrated in the modular cabin element.

5. The device for use in a passenger cabin of claim 1, wherein the at least one privacy screen roller blind in a functional position thereof is affixed to the ceiling structure of the passenger cabin, to the underside of the hatrack, or to the passenger service unit (PSU) panel by a locking mechanism.

6. The device for use in a passenger cabin of claim 1, wherein the at least one privacy screen roller blind is configured as a roller shutter or a venetian kind.

7. The device for use in a passenger cabin of claim 1, wherein the at least one rollable privacy screen roller blind is made from canvas, linen, a plastic foil or a rubber, and wherein a material for the at least one rollable privacy screen comprises a flame-retardant material.

8. The device for use in a passenger cabin of claim 1, wherein the modular cabin element, attached to the guide rails of the at least one passenger seat by way of a quick-release fastener, comprises a drum for the purpose of rolling up the at least one privacy screen roller blind.

9. The device for use in a passenger cabin of claim 1, further comprising:
as a safety element for the delimited zone, an opening, integrated in the at least one privacy screen roller blind, the opening configured to be used as a door in the case of an emergency.

10. The device for use in a passenger cabin of claim 1, wherein the modular cabin element, configured as a retrofit kit, is configured to be integrated in an existing passenger cabin.

11. The device for use in a passenger cabin of claim 1, configured as a passenger cabin of an aircraft.

12. An aircraft comprising a device for use in a passenger cabin, the device comprising:
at least one passenger seat;
guide rails, positioned so as to be stationary, intended for the at least one passenger seat;
a delimited zone for at least one passenger seat; and
at least one flexible privacy screen roller blind configured as a partition element to implement the delimited zone;
wherein the at least one privacy screen roller blind is associated with a modular cabin element attached in a positionally variable manner to the guide rails of the at least one passenger seat;

wherein the at least one privacy screen roller blind in a functional position extends between the modular cabin element and at least one element selected from the group consisting of:
an underside of a hatrack;
a passenger service unit (PSU) panel;
a ceiling structure; and
a sidewall lining.

13. A method for installing and operating a device for providing a delimited zone in a passenger cabin of a means of transport, the device comprising at least one passenger seat, associated with stationary guide rails of the at least one passenger seat, and a modular cabin element with an integrated privacy screen roller blind which in a positionally variable manner is attached to the guide rails of the at least one passenger seat, the method comprising:
   installing the modular cabin element to the guide rails of the at least one passenger seat;
   adjusting the privacy screen roller blind;
   locking the privacy screen roller blind to a ceiling structure of the passenger cabin, or to an underside of a hatrack, or to a passenger service unit (PSU) panel.

* * * * *